(12) United States Patent
Igarashi

(10) Patent No.: US 8,872,872 B2
(45) Date of Patent: Oct. 28, 2014

(54) OPTICAL SCANNING APPARATUS, INCLUDING AN ADJUSTOR, AND IMAGE FORMING APPARATUS

(71) Applicant: Canon Kabushiki Kaisha, Tokyo (JP)

(72) Inventor: Jun Igarashi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 28 days.

(21) Appl. No.: 13/655,640

(22) Filed: Oct. 19, 2012

(65) Prior Publication Data
US 2013/0100509 A1    Apr. 25, 2013

(30) Foreign Application Priority Data

Oct. 21, 2011   (JP) ................................. 2011-231338
Oct. 15, 2012   (JP) ................................. 2012-227979

(51) Int. Cl.
| | | |
|---|---|---|
| *B41J 2/435* | (2006.01) | |
| *B41J 15/14* | (2006.01) | |
| *B41J 27/00* | (2006.01) | |
| *H04N 1/028* | (2006.01) | |
| *G02B 27/00* | (2006.01) | |
| *G02B 26/10* | (2006.01) | |
| *G02B 26/12* | (2006.01) | |

(52) U.S. Cl.
CPC ............ *G02B 26/10* (2013.01); *H04N 1/02815* (2013.01); *G02B 27/0031* (2013.01); *G02B 26/123* (2013.01)
USPC ............ 347/236; 347/241; 347/146; 347/256

(58) Field of Classification Search
USPC ......... 347/230, 231, 236, 237, 241, 243, 246, 347/247, 253, 255, 256–261
See application file for complete search history.

(56) References Cited

U.S. PATENT DOCUMENTS

| | | | | |
|---|---|---|---|---|
| 7,414,934 | B2 * | 8/2008 | Lee ............................. | 369/47.51 |
| 8,223,184 | B2 * | 7/2012 | Kato ............................ | 347/241 |
| 2009/0279919 | A1 | 11/2009 | Kato | |
| 2011/0141536 | A1 * | 6/2011 | Tatsuno ..................... | 359/204.1 |

FOREIGN PATENT DOCUMENTS

| | | |
|---|---|---|
| JP | 2000351234 A | 12/2000 |
| JP | 2009271352 A | 11/2009 |

* cited by examiner

*Primary Examiner* — Hai C Pham
(74) *Attorney, Agent, or Firm* — Rossi, Kimms & McDowell LLP

(57) ABSTRACT

An optical scanning apparatus, including: light sources; a deflector configured to deflect beams emitted from the light sources; and imaging optical systems configured to focus the beams deflected by a deflecting surface of the deflector on surfaces to be scanned, respectively, wherein: the beams entering the deflecting surface are P-polarized beam; the optical scanning apparatus further includes at least one reflection optical element reflecting a beam in a sub-scanning cross section on each of optical paths from the deflecting surface to the surfaces to be scanned; the optical paths include first and second optical paths having different numbers of the reflection optical elements from each other; and the optical scanning apparatus further includes an adjustor configured to adjust an output of a light source corresponding to at least one of the first and the second optical paths from among the light sources so that predetermined conditions are satisfied.

12 Claims, 9 Drawing Sheets

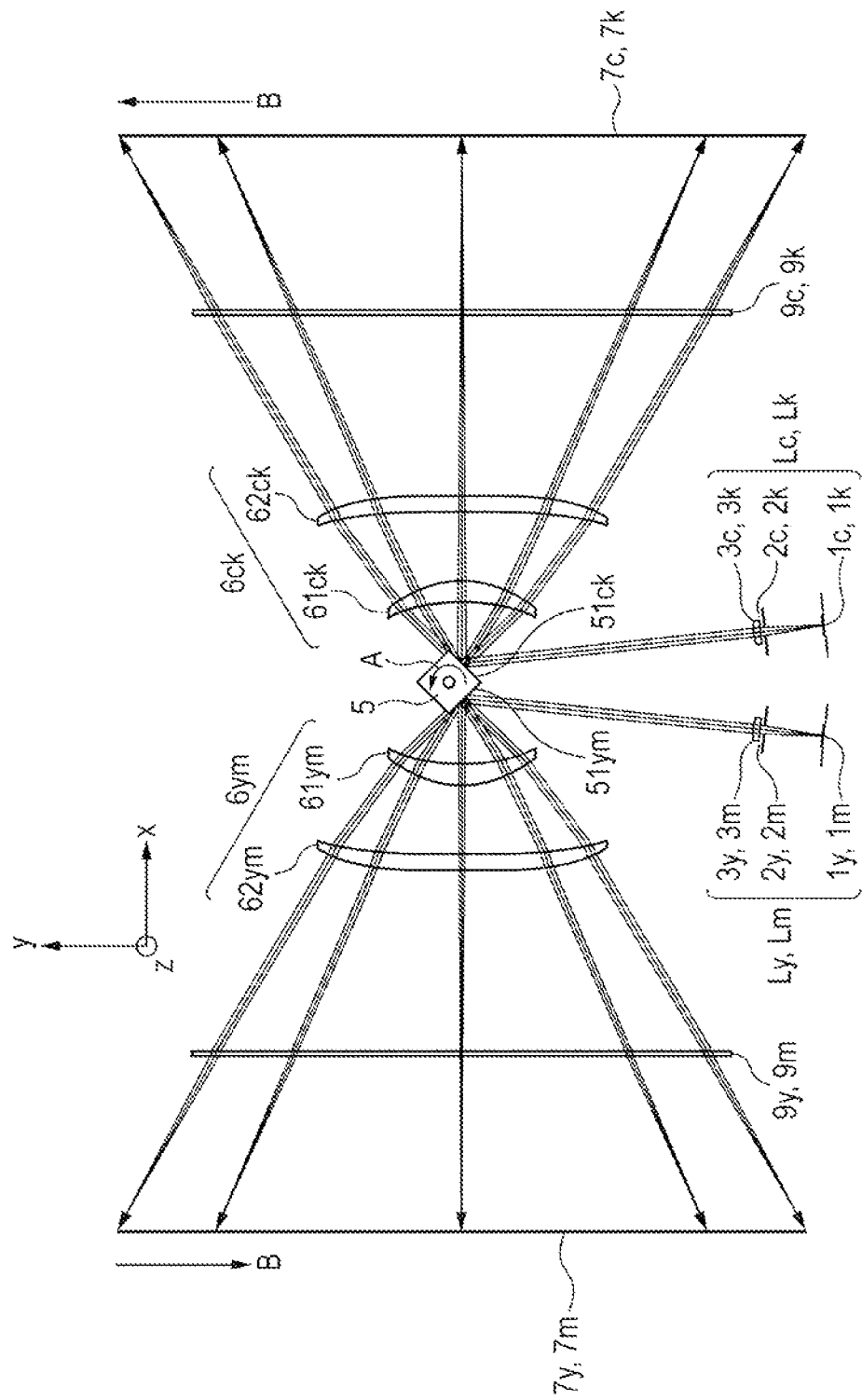

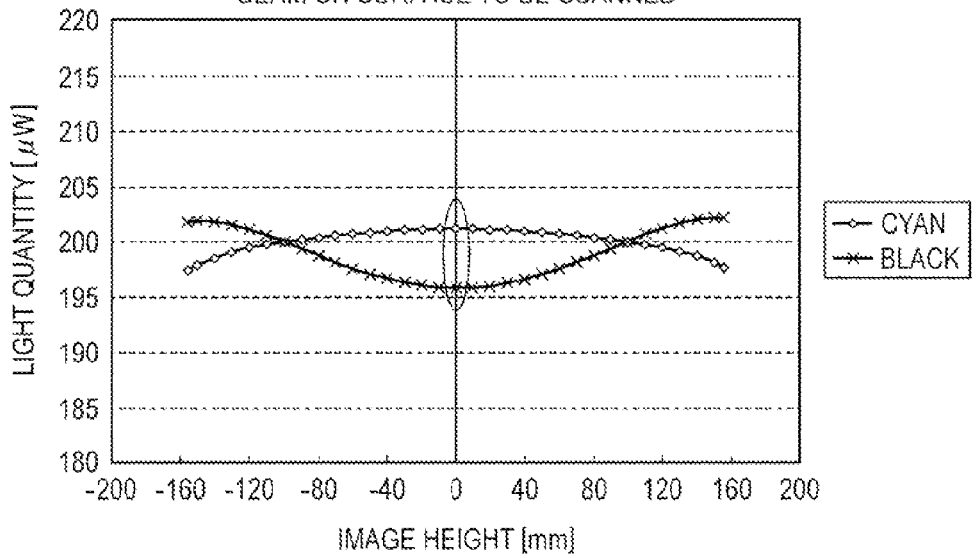
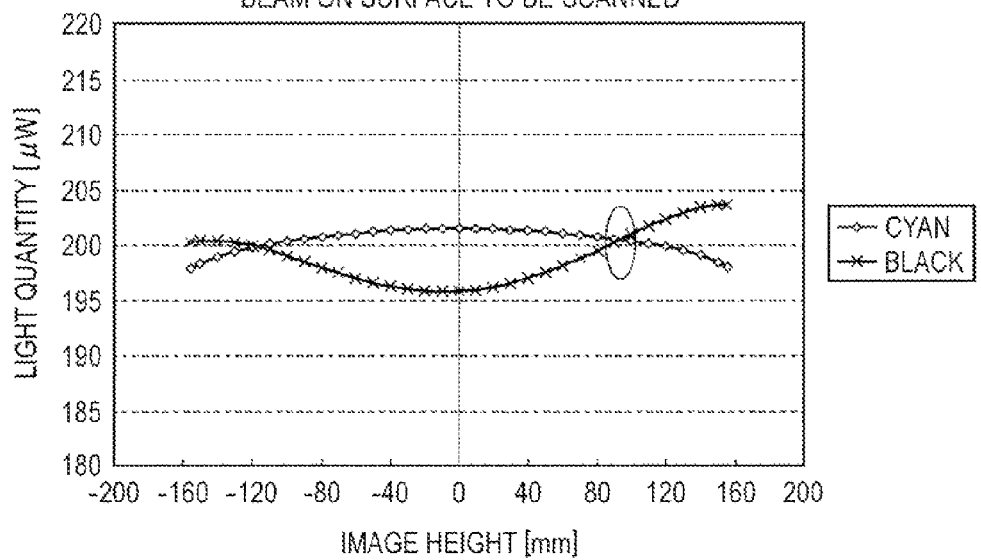

OPTICAL SCANNING APPARATUS, INCLUDING AN ADJUSTOR, AND IMAGE FORMING APPARATUS

BACKGROUND OF THE INVENTION

1. Field of the Invention

The present invention relates to an optical scanning apparatus, and more particularly, to an optical scanning apparatus used for an image forming apparatus such as a laser beam printer (LBP), a digital copying machine and a multifunction printer (MFP).

2. Description of the Related Art

Conventionally, in an optical scanning apparatus included in an image forming apparatus such as a laser beam printer (LBP) or a digital copying machine, an optically-modulated beam is emitted from a light source such as a laser light source in response to an image signal. The optically-modulated beam is then periodically deflected by a deflector such as a polygon mirror. The deflected beam is condensed in a spot on a photosensitive surface of a photosensitive member serving as an image bearing member by an imaging optical system having an fθ characteristic. Accordingly, the photosensitive surface is optically scanned to perform image recoding.

Further, a tandem-type image forming apparatus has been proposed, in which a plurality of surfaces to be scanned respectively corresponding to each color in color image formation are simultaneously scanned. In an optical scanning apparatus included in the tandem-type image forming apparatus (hereinafter referred to as a "tandem-type optical scanning apparatus"), a plurality of beams deflected for scanning by the deflector are guided to a plurality of surfaces to be scanned that differ from each other, respectively, via corresponding imaging optical elements and reflection optical elements. The beam traveled through the imaging optical element and the reflection optical element scans a photosensitive surface as the surface to be scanned at a substantially constant speed.

However, there is a problem that a change of a level of an optical intensity (ratio of image plane illuminances) is generated depending on each image height. The ratio of image plane illuminances is generated due to a difference in transmittance of an optical element such as an imaging optical element, through which the beam emitted from the light source passes within a period until arriving at the surface to be scanned, depending on an incident angle of the beam, a difference in thickness of the imaging optical element depending on the image height, a defect of the fθ characteristic, or the like.

In addition, in the tandem-type optical scanning apparatus, it is necessary to equalize optical path lengths along which the plurality of beams deflected by the deflector arrive at the corresponding surface to be scanned, respectively. For this reason, considering an arrangement of each member, the number of reflection optical elements (the number of reflection surfaces) arranged on the optical path is set different between the plurality of optical paths in many cases. In addition, the reflection optical elements used on the respective optical paths generally have the same reflectance, and hence a difference in the ratio of image plane illuminances is generated on the surface to be scanned between the optical paths having the different numbers of reflection optical elements from each other. The ratio of image plane illuminances affects a density of a formed image in a main scanning direction, and hence in the tandem-type optical scanning apparatus, it is necessary to suppress the difference in the ratio of image plane illuminances between different optical paths.

Japanese Patent Application Laid-Open No. 2000-351234 discloses an apparatus which includes a light quantity measuring unit that measures a ratio of image plane illuminances on a surface to be scanned and a light intensity correction unit that corrects an intensity of a beam emitted from a light source, and corrects the ratio of image plane illuminances electrically based on a measurement result of the ratio of image plane illuminances. Further, Japanese Patent Application Laid-Open No. 2009-271352 discloses an apparatus which corrects a ratio of image plane illuminances by setting different reflectances for respective reflection optical elements and adding an angle dependency of the reflectance.

However, in the apparatus disclosed in Japanese Patent Application Laid-Open No. 2000-351234, an additional unit such as the light intensity correction unit needs to be separately provided, and hence a configuration of the optical scanning apparatus becomes complicated. In addition, in the apparatus disclosed in Japanese Patent Application Laid-Open No. 2009-271352, a reflection optical element having a different angle dependency of the reflectance needs to be provided for each optical path in order to correct the ratio of image plane illuminances on each optical path. Therefore, the methods of correcting the ratio of image plane illuminances described in Japanese Patent Application Laid-Open No. 2000-351234 and Japanese Patent Application Laid-Open No. 2009-271352 still have a problem that the manufacturing cost of the optical scanning apparatus increases.

SUMMARY OF THE INVENTION

In view of the above, it is an object of the present invention to provide an optical scanning apparatus that suppresses a difference in a ratio of image plane illuminances between optical paths by a simple method and is suitable for high quality printing, and to provide an image forming apparatus including the optical scanning apparatus.

Provided is an optical scanning apparatus, including: a plurality of light sources; a deflector configured to deflect a plurality of beams emitted from the plurality of light sources; and a plurality of imaging optical systems configured to focus the plurality of beams deflected by a deflecting surface of the deflector on a plurality of surfaces to be scanned, respectively, in which: the plurality of beams entering the deflecting surface of the deflector are P-polarized beam; the optical scanning apparatus further includes at least one reflection optical element reflecting a beam in a sub-scanning cross section on each of a plurality of optical paths from the deflecting surface of the deflector to the plurality of surfaces to be scanned; the plurality of optical paths include a first optical path and a second optical path having different numbers of the reflection optical elements from each other; and the optical scanning apparatus further includes an adjustor configured to adjust an output of a light source corresponding to at least one of the first optical path and the second optical path from among the plurality of light sources so that the following conditions are satisfied:

$Ap < Bp;$ $Am > Bm;$ and $0.4W < L < 0.8W,$ where Ap and Am are a light quantity at a center image height and a light quantity on a higher side among most off-axial image heights, respectively, on a surface to be scanned corresponding to one of the first optical path and the second optical path having a smaller number of the reflection optical elements, Bp and Bm are a light quantity at the center image height and a light quantity on a lower side among the most off-axial image heights, respectively, on a surface to be scanned corresponding to one of the first optical path and the second optical path having a larger number of the reflection optical elements, ±W is an effective scanning range in a main scanning direction with respect to the center image height on a surface to be scanned corresponding to each of the first optical path and the second optical path, and L is an image height allowing the same light quantity on a surface to be scanned corresponding to the first optical path and a surface to be scanned corresponding to the second optical path.

Further features of the present invention will become apparent from the following description of exemplary embodiments with reference to the attached drawings.

BRIEF DESCRIPTION OF THE DRAWINGS

FIG. 2A is a main-scanning cross-sectional view of a tandem-type optical scanning apparatus according to the first embodiment.

FIG. 4 is a graph showing a ratio of image plane illuminances for each optical path in an optical scanning apparatus according to a second embodiment of the present invention.

FIG. 5 is a graph showing a ratio of image plane illuminances for each optical path in an optical scanning apparatus according to a third embodiment of the present invention.

DESCRIPTION OF THE EMBODIMENTS

In the following, embodiments of the present invention are described with reference to the drawings.

First Embodiment

Image Forming Apparatus

Figure 3:
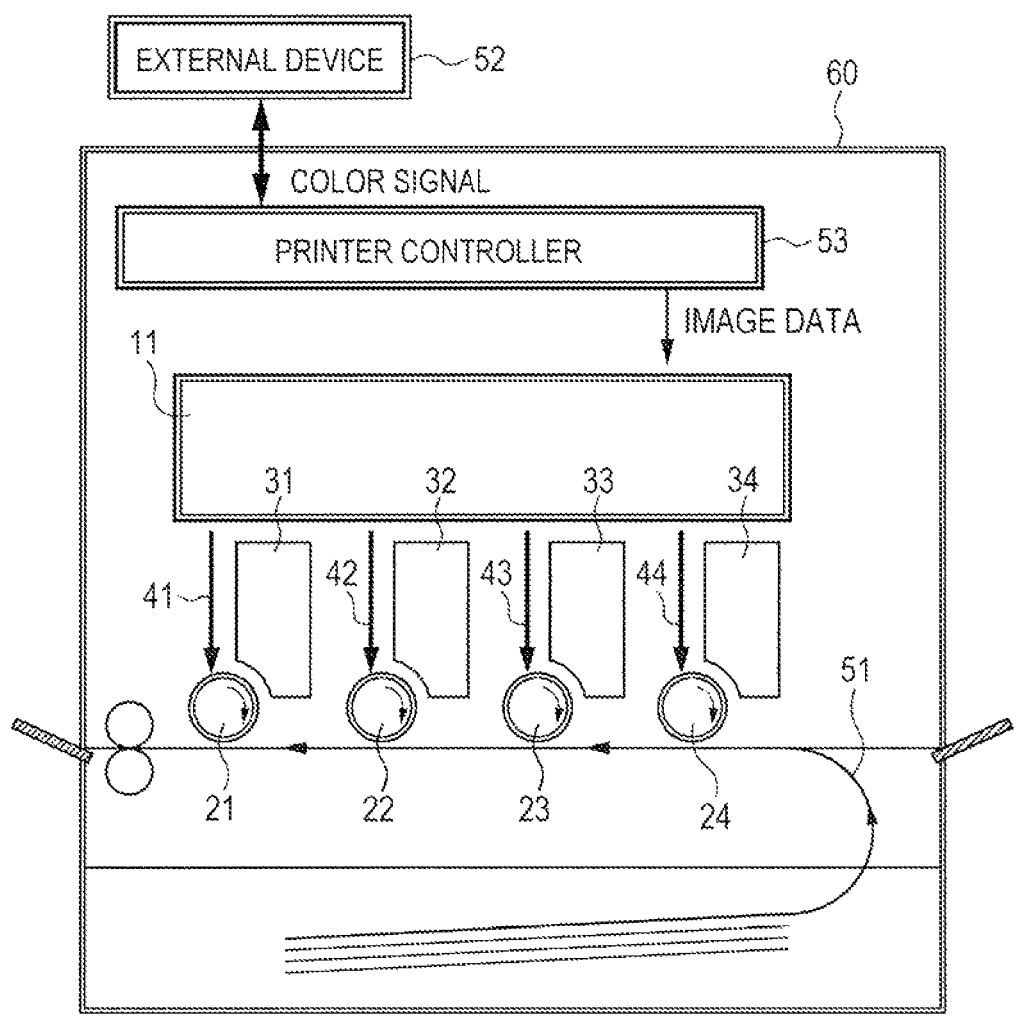
FIG. 3 is a schematic diagram illustrating main parts of a color image forming apparatus according to the first embodiment.

FIG. 3 is a schematic diagram illustrating main parts of a color image forming apparatus according to an embodiment of the present invention. A color image forming apparatus 60 is of tandem type, which includes an optical scanning apparatus 11 using light beams 41, 42, 43 and 44 for scanning to record concurrently image information on photosensitive surfaces of respective photosensitive drums (image bearing members) 21, 22, 23 and 24.

In FIG. 3, respective color signals of red (R), green (G) and blue (B) are input from an external device 52 such as a personal computer to the color image forming apparatus 60. The color signals are converted into pieces of image data (dot data) of yellow (Y), magenta (M), cyan (C) and black (K) by a printer controller 53 in the color image forming apparatus. The respective pieces of image data are input to the optical scanning apparatus 11. Then, the light beams 41, 42, 43 and 44, which are modulated according to the respective pieces of image data, are emitted from the optical scanning apparatus 11. The photosensitive surfaces of the photosensitive drums 21, 22, and 24 are scanned with the light beams in a main scanning direction.

In the color image forming apparatus of the first embodiment, the optical scanning apparatus 11 scans four beams, corresponding to the respective colors of yellow (Y), magenta (M), cyan (C) and black (K). The optical scanning apparatus concurrently records the image signals (image information) on the surfaces of the photosensitive drums 21, 22, 23 and 24 and prints a color image at high speed.

As described above, the color image forming apparatus of the first embodiment uses the light beams which are respectively based on image data and emitted from the optical scanning apparatus 11 to form latent images of four colors on the photosensitive surfaces of the photosensitive drums 21, 22, 23 and 24 respectively associated with the four colors. Then, toner images of respective colors are formed by developing devices 31, 32, 33 and 34, and the toner images of the respective colors are then transferred to a recording material, which is conveyed by a conveyor belt 51, one on another through multilayer transfer to form one full color image.

The external device 52 may be a color image reading device including, for example, a CCD sensor. In this case, the color image reading device and the color image forming apparatus 60 constitute a color digital copying machine.

Optical Scanning Apparatus

Figure 2B:
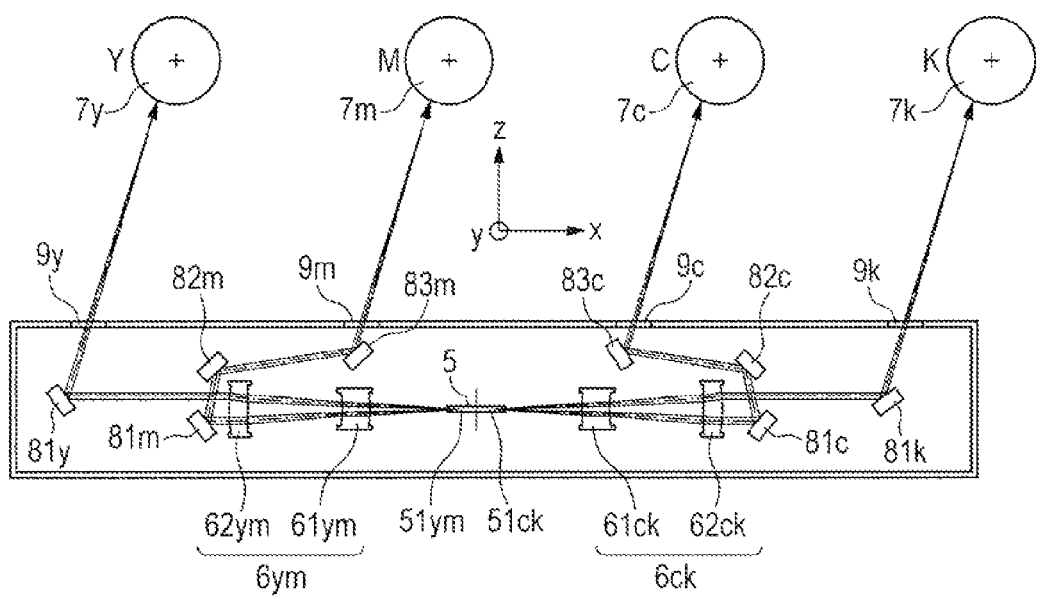
FIG. 2B is a sub-scanning cross-sectional view of the tandem-type optical scanning apparatus according to the first embodiment.

FIG. 2A is a cross-sectional view in the main scanning direction (main-scanning cross-sectional view) of main parts of a tandem-type optical scanning apparatus according to the first embodiment of the present invention, and FIG. 2B is a cross-sectional view in a sub-scanning direction (sub-scanning cross-sectional view) of the main parts of the tandem-type optical scanning apparatus according to the first embodiment. In the following description, the sub-scanning direction (Z-direction) is a direction parallel to a rotation axis of a deflector. The main-scanning cross section is a cross section of which the normal is in the sub-scanning direction. The main scanning direction (Y-direction) is a direction in which a position scanned by the beam deflected for scanning by the deflector is projected on the main-scanning cross section. A sub-scanning cross section is a cross section of which the normal is in the main scanning direction.

In FIG. 2A, each of light sources 1y, 1m, 1c and 1k is formed of a semiconductor laser. Apertures 2y, 2m, 2c and 2k shape divergent beams of P-polarized light emitted from the light sources 1y, 1m, 1c and 1k into specific beam profiles, respectively. Each of condenser lenses 3*y*, 3*m*, 3*c* and 3*k* is an anamorphic collimator lens having different refractive powers in the main-scanning cross section and in the sub-scanning cross section.

With this configuration, the divergent beams that have respectively passed through the apertures 2*y*, 2*m*, 2*c* and 2*k* are converted into collimated beams (or convergent beams) in the main scanning direction and convergent beams in the sub-scanning direction. That is, each of the condenser lenses 3*y*, 3*m*, 3*c* and 3*k* functions as a beam converting unit that converts a condensing state of each beam. The light sources 1*y*, 1*m*, 1*c* and 1*k*, the apertures 2*y*, 2*m*, 2*c* and 2*k*, and the condenser lenses 3*y*, 3*m*, 3*c* and 3*k* respectively constitute incidence optical systems Ly, Lm, Lc and Lk.

Each of the condenser lenses 3*y*, 3*m*, 3*c* and 3*k* may be formed of two optical elements (a collimator lens and a cylindrical lens). Further, the condenser lenses 3*y*, 3*m*, 3*c* and 3*k* may be formed in an integrated manner. A deflector 5 is a polygon mirror that is rotated by a driving unit (not shown) including a motor in a direction of an arrow A in FIG. 2A at a constant speed (constant angular velocity). The beams emitted from the light sources 1*y* and 1*m* enter a deflecting surface 51*ym* of the deflector 5, and the beams emitted from the light sources 1*c* and 1*k* enter a deflecting surface 51*ck* of the deflector 5. Imaging optical systems 6*ym* and 6*ck* have a condensing function and an fθ characteristic.

The imaging optical system 6*ym* according to the first embodiment includes a first imaging lens 61*ym* and a second imaging lens 62*ym*, and the imaging optical system 6*ck* includes a first imaging lens 61*ck* and a second imaging lens 62*ck*. Each of the first imaging lenses 61*ym* and 61*ck* and the second imaging lenses 62*ym* and 62*ck* according to the first embodiment has different powers in the main-scanning cross section and in the sub-scanning cross section and is a toric lens made of a plastic material (resin). The first imaging lenses 61*ym* and 61*ck* and the second imaging lenses 62*ym* and 62*ck* focus the plurality of beams deflected by the deflecting surfaces 51*ym* and 51*ck* of the deflector 5 on photosensitive drum surfaces 7*y*, 7*m*, 7*c* and 7*k*, which are surfaces to be scanned (on the surfaces to be scanned).

The first imaging lenses 61*ym* and 61*ck* and the second imaging lenses 62*ym* and 62*ck* perform optical face tangle error compensations of the deflecting surfaces 51*ym* and 51*ck*, respectively, by setting a conjugate relationship between the deflecting surface 51*ym* of the deflector 5 and the photosensitive drum surfaces 7*y* and 7*m* and between the deflecting surface 51*ck* of the deflector 5 and the photosensitive drum surfaces 7*c* and 7*k* in the sub-scanning cross section. Each of the first imaging lenses 61*ym* and 61*ck* have a positive power in the main-scanning cross section and a negative power in the sub-scanning cross section on the optical axis.

Dustproof glasses 9*y*, 9*m*, 9*c* and 9*k* are disposed between the imaging optical systems 6*ym* and 6*ck* and the surfaces to be scanned 7*y*, 7*m*, 7*c* and 7*k*, respectively, to prevent a penetration of a dust into the optical scanning apparatus.

Hereinafter, means to achieve the object of the first embodiment and effects of the first embodiment are described. The optical scanning apparatus according to the first embodiment guides the beams emitted from the four light sources 1*y*, 1*m*, 1*c* and 1*k* to the four different surfaces to be scanned 7*y*, 7*m*, 7*c* and 7*k*, respectively, to perform optical scanning. In the following, in a description of a function of the optical scanning apparatus, the optical path of the beam emitted from the single light source 1*k* is described for the sake of simplicity.

The divergent beam emitted from the semiconductor laser 1*k* as the light source is subjected to a light quantity restriction by the aperture 2*k* and enters the corresponding condenser lens 3*k*. The condenser lens 3*k* converts the beam from the light source 1*k* into a collimated beam regarding on the main-scanning cross section, and converts a state of the beam to focus on the deflecting surface 51*ck* of the deflector 5 regarding on the sub-scanning cross section. The beam entering the deflector 5 is deflected by the deflecting surface 51*ck* and then enters the imaging optical system 6*ck*.

The imaging optical system 6*ck* according to the first embodiment includes the first imaging lens 61*ck* made of plastic and mainly having a power in the main scanning direction and the second imaging lens 62*ck* made of plastic and mainly having a power in the sub-scanning direction. In the imaging optical system 6*ck*, a part of the lenses may be made of plastic. The imaging optical system 6*ck* focuses the deflected beam from the deflecting surface 51*ck* on the surface to be scanned 7*k*, and at the same time, performs an optical face tangle error compensation of the deflecting surface 51*ck*.

The first imaging lens 61*ck* and the second imaging lens 62*ck* according to the first embodiment are shared on the two optical paths for the beams emitted from the light sources 1*c* and 1*k*. The configuration and the manufacturing method of the imaging optical system 6*ck* are not limited to the above-mentioned ones. The beam focused on the surface to be scanned 7*k* by the above-mentioned imaging optical system 6*ck* is deflected and scanned on the surface to be scanned 7*k* in a direction of an arrow B (the main scanning direction) at a constant angular velocity by a rotation of the deflector 5. The optical scanning apparatus according to the first embodiment is a tandem-type optical scanning apparatus that records image information corresponding to four different colors on the four different surfaces to be scanned 7*y*, 7*m*, 7*c* and 7*k* in a simultaneous manner. In the following, this tandem-type optical scanning apparatus is described in detail.

The four light sources 1*y*, 1*m*, 1*c* and 1*k* according to the first embodiment are arranged in a rectangular shape in the main scanning direction and the sub-scanning direction. The beams from the light sources 1*c* and 1*k* enter the deflecting surface 51*ck* of the deflector 5, and the beams from the light sources 1*y* and 1*m* enter the deflecting surface 51*ym* of the deflector 5, thus the beams are separated in a lateral direction of the deflector 5. Further, by causing the beams from the light sources 1*c* and 1*k* to have different incident angles from each other in the sub-scanning cross section to obliquely enter the deflector 5, the beams from the light sources 1*c* and 1*k* are spatially separated by a reflection optical element (mirror) 81*c* arranged subsequent to the first imaging lens 61*ck* and the second imaging lens 62*ck*. The same goes for the beams from the light sources 1*y* and 1*m*.

In this manner, by causing the plurality of beams having different oblique incident angles with respect to the deflector 5 to enter the two different deflecting surfaces 51*ym* and 51*ck* of the deflector 5, the four beams can be scanned by the single deflector 5 in a simultaneous manner.

The beams from the light sources 1*y* and 1*k* that travel toward the surfaces to be scanned 7*y* and 7*k* spatially farthest from the deflector 5 are deflected and scanned by the deflector 5, and then deflected by reflection optical elements 81*y* and 81*k*, respectively, thus being guided to the surfaces to be scanned 7*y* and 7*k*, respectively. In the following, each of the optical paths of the beams from the light sources 1*y* and 1*k* traveling toward the surfaces to be scanned 7*y* and 7*k* are referred to as an "outer side optical path". In the first embodiment, all of the reflection optical elements reflect the beams in the sub-scanning cross section.

On the other hand, the beams from the light sources 1m and 1c that travel toward the surfaces to be scanned 7m and 7c spatially closest to the deflector 5 are deflected and scanned by the deflector 5, and then deflected by three reflection optical elements 81m, 82m and 83m and three reflection optical elements 81c, 82c and 83c, respectively. The beams from the light sources 1m and 1c are then guided to the surfaces to be scanned 7m and 7c, respectively. In the following, each of the optical paths of the beams from the light sources 1m and 1c traveling toward the surfaces to be scanned 7m and 7c are referred to as an "inner side optical path".

The reason why the number of the reflection optical elements differs between the outer side optical path and the inner side optical path is because, under a condition that optical lengths are required to be equal in all the optical paths, an arrangement of the reflection optical elements is determined considering a physical interference between the optical elements and the optical paths and an assembly performance. Although the number of the reflection optical elements is three on the inner side optical path and one on the outer side optical path in the first embodiment, the number of the reflection optical elements is not limited to these numbers. The numbers of the reflection optical elements on the inner side optical path and the outer side optical path may be determined appropriately depending on an interval between the plurality of surfaces to be scanned and a position of the imaging optical element.

The imaging optical element (imaging lens) used in the first embodiment is made of plastic. The plastic lens used in the optical scanning apparatus is often provided without an antireflection coating from the aspect of manufacturing, and also in the first embodiment, the plastic lens is a non-coated lens. When a beam in a polarized state enters a lens without the antireflection coating, a transmittance differs depending on the angle of field. This means that there is a problem that an image plane illuminance is nonuniform on the surface to be scanned.

The nonuniformity of the image plane illuminance generated in the above manner needs to be compensated by causing a reflection optical element to have an inverse characteristic, i.e., by using a reflection optical element having a different reflectance depending on the incident angle (having an angle dependency of the reflectance). However, in order to suppress the manufacturing cost of the optical scanning apparatus, it is required to use reflection optical elements all having the same film structure. Regarding a film characteristic of a general inexpensive reflection optical element formed of Al (aluminum), a reflectance of a P-polarized beam decreases as a reflection angle increases, and hence a light quantity on the surface to be scanned at an edge portion image height is likely to be decreased if an optical path includes a large number of reflection optical elements disposed thereon (this is described in detail later).

In the tandem-type optical scanning apparatus, as well as a correction for a ratio of image plane illuminances, it is even more important to suppress a difference in the ratio of image plane illuminances between a plurality of surfaces to be scanned. This is because the difference in the ratio of image plane illuminances between the plurality of surfaces to be scanned causes a density nonuniformity for each color, resulting in a color nonuniformity in a scanning area. The color nonuniformity after superimposing a plurality of colors generally has a higher visibility than the density nonuniformity of a single color, and hence in the tandem-type optical scanning apparatus, an emphasis is placed on the suppression of the difference in the ratio of image plane illuminances between the plurality of surfaces to be scanned. In general, if the ratio of image plane illuminances exceeds 10 points between the plurality of optical paths, the visibility of the color nonuniformity after superimposing plurality of colors is increased, which is problematic.

Figure 12:
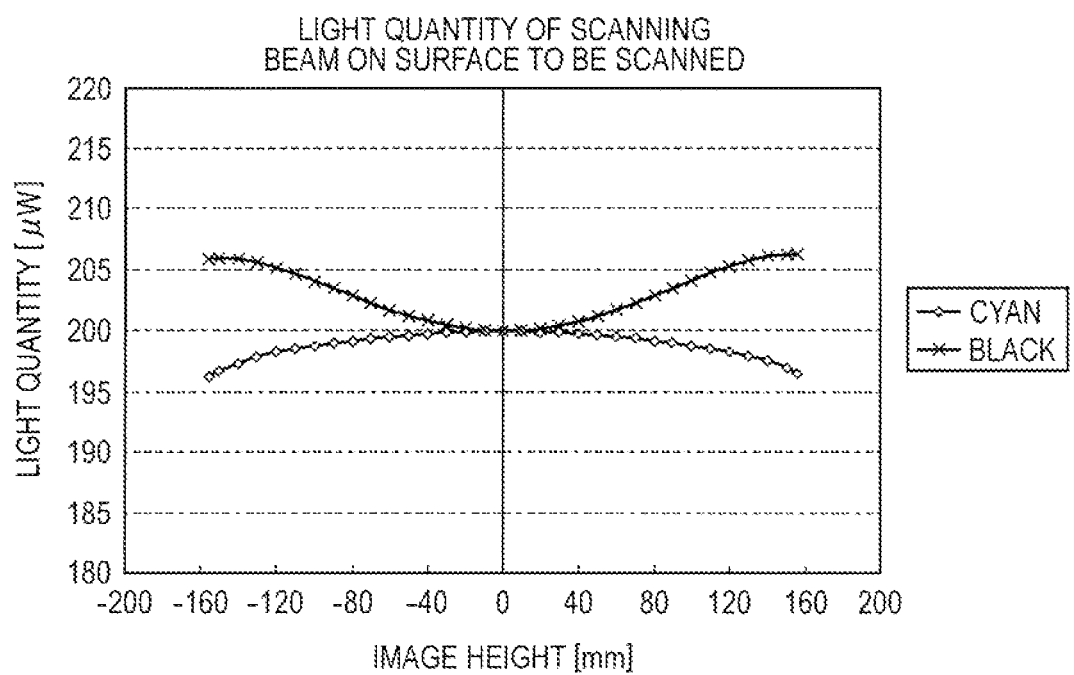
FIG. 12 is a graph showing a ratio of image plane illuminances for each optical path in a conventional optical scanning apparatus.

The ratio of image plane illuminances of cyan and black in the conventional case is shown in a graph of FIG. 12. The graph of FIG. 12 shows the ratio of image plane illuminances of a black optical path of the outer side optical paths on which one reflection optical element is disposed, through which a beam is guided to the surface to be scanned 7k, and a cyan optical path of the inner side optical paths on which three reflection optical elements are disposed, through which a beam is guided to the surface to be scanned 7c. In the conventional optical scanning apparatus, a light quantity is measured near a center image height of each optical path, and an output of the light source is adjusted to achieve the same light quantity. The ratio of image plane illuminances is then maximized between the optical paths at the most off-axial image height, causing the color nonuniformity to be conspicuous between the center image height and the most off-axial image height after superimposing a plurality of colors.

Scanning Optical System

Hereinafter, a specific numerical example of the scanning optical system is shown.

An optical arrangement and a lens plane profile in the first embodiment are shown in Tables 1 and 2, respectively.

TABLE 1

| Imaging optical system data | | | |
|---|---|---|---|
| Oblique incident angle in main-scanning cross section | [deg] | | 84 |
| Oblique incident angle in sub-scanning cross section | [deg] | Y | 3 |
| fθ coefficient | [mm/rad] | f | 189 |
| Wavelength of light source | [nm] | λ | 790 |
| Refractive index of imaging lens | | N | 1.523972 |
| Maximum deflecting angle | [deg] | θmax | ±47.3 |
| Deflecting point-incident surface of imaging lenses 61ym and 61ck | [mm] | D1 | 30.0 |
| Incident surface of imaging lenses 61ym and 61ck-exit surface of imaging lenses 61ym and 61ck | [mm] | D2 | 10.5 |
| Exit surface of imaging lenses 61ym and 61ck-incident surface of imaging lenses 62ym and 62ck | [mm] | D3 | 31.0 |
| Incident surface of imaging lenses 62ym and 62ck-exit surface of imaging lenses 62ym and 62ck | [mm] | D4 | 6.5 |
| Exit surface of imaging lenses 62ym and 62ck-surface to be scanned | [mm] | D5 | 154.2 |
| Deflecting point-surface to be scanned | [mm] | D | 232.2 |
| Effective scanning range | [mm] | W | 272 |
| Incident surface sub-scanning direction shift amount of imaging lenses 62ym and 62ck | [mm] | | 3.4 |
| Exit surface sub-scanning direction shift amount of imaging lenses 62ym and 62ck | [mm] | | 3.65 |
| Number of surfaces of polygon mirror | [Surfaces] | | 4 |
| Circumscribed circle diameter of polygon mirror | [Φ] | | 20 |

TABLE 2

Imaging lens profile data

|  |  | Imaging lenses 61ym and 61ck | | Imaging lenses 62ym and 62ck | |
|---|---|---|---|---|---|
|  |  | Incident surface | Exit surface | Incident surface | Exit surface |
| Main scanning direction | R | −125.360 | −51.917 | −410.321 | −2775.692 |
|  | K | −5.59E+00 | −3.37E+00 | −1.41E+01 | 1.61E+03 |
|  | B4u | −1.28E−06 | −2.51E−06 | −1.48E−07 | −6.97E−07 |
|  | B6u | 1.79E−10 | 1.00E−09 | −1.41E−11 | 6.25E−11 |
|  | B8u |  | −8.97E−13 |  | −6.26E−15 |
|  | B10u |  | 3.00E−16 |  | −3.01E−19 |
|  | B4l | −1.28E−06 | −2.51E−06 | −1.48E−07 | −6.97E−07 |
|  | B6l | 1.79E−10 | 1.00E−09 | −1.41E−11 | 6.25E−11 |
|  | B8l |  | −8.97E−13 |  | −6.26E−15 |
|  | B10l |  | 3.00E−16 |  | −3.01E−19 |
| Sub-scanning direction | r | 25 | 25 | 200 | −27.243 |
|  | D2u |  | 7.64E−07 | −8.71E−07 | 5.21E−06 |
|  | D4u |  | 3.67E−09 | 5.54E−10 | −1.72E−09 |
|  | D6u |  | 3.29E−13 | −2.89E−13 | 3.53E−13 |
|  | D8u |  | 1.84E−16 | 2.54E−17 | −7.88E−17 |
|  | D10u |  | −1.53E−18 | 6.47E−21 | 1.24E−20 |
|  | D2l |  | 1.09E−06 | −8.71E−07 | 5.90E−06 |
|  | D4l |  | −9.11E−12 | 5.54E−10 | −2.55E−09 |
|  | D6l |  | −3.20E−14 | −2.89E−13 | 9.11E−13 |
|  | D8l |  | 4.09E−15 | 2.54E−17 | −2.38E−16 |
|  | D10l |  | −2.71E−18 | 6.47E−21 | 2.84E−20 |
|  | M0__1u |  | −9.84E−03 |  | −9.50E−02 |
|  | M2__1u |  | −1.00E−06 |  | 1.28E−05 |
|  | M4__1u |  | 3.01E−09 |  | −2.72E−09 |
|  | M6__1u |  | 4.25E−13 |  | 1.23E−12 |
|  | M8__1u |  | −3.66E−16 |  | −1.83E−16 |
|  | M10__1u |  | −1.78E−21 |  | −3.11E−20 |
|  | M0__1l |  | −9.84E−03 |  | −9.50E−02 |
|  | M2__1l |  | −4.20E−06 |  | 1.24E−05 |
|  | M4__1l |  | 1.66E−09 |  | −5.81E−09 |
|  | M6__1l |  | −4.56E−13 |  | 2.10E−12 |
|  | M8__1l |  | −1.31E−16 |  | −5.91E−16 |
|  | M10__1l |  | 2.55E−20 |  | 5.75E−20 |

Meridional line profiles of the incident surfaces and the exit surfaces of the first imaging lenses 61ym and 61ck and the second imaging lenses 62ym and 62ck according to the first embodiment are formed of an aspherical profile represented as a function of up to 10th order. Each of the lens surfaces of the imaging lenses 61ym, 61ck, 62ym and 62ck is defined from an aspheric equation described below. The surface profile of each lens surface is represented by the following equation defining a meridional line direction corresponding to the main scanning direction, where an intersection of each lens surface and an optical axis (X axis) is set as the origin, and an axis orthogonal to the optical axis in the main-scanning cross section is set to the Y axis.

$$X = \frac{Y^2/R}{1 + \left(1 - (1+K)(Y/R)^2\right)^{1/2}} + B_4 Y^4 + B_6 Y^6 + B_8 Y^8 + B_{10} Y^{10}$$

where R is a meridional line curvature radius and K, $B_4$, $B_6$, $B_8$ and $B_{10}$ are each an aspherical surface coefficient.

The surface profile of each lens surface is represented by the following equation defining a sagittal line direction corresponding to the sub-scanning direction, where an axis orthogonal to the optical axis in the sub-scanning cross section is set to the Z axis.

$$S = \frac{Z^2/r'}{1 + \left(1 - (Z/r')^2\right)^{1/2}} + \sum \sum M_{j\_k} Y^j Z^k$$

where S indicates a sagittal line shape defined in a plane which includes a meridional line normal at each position in the meridional line direction and is perpendicular to the main-scanning cross section.

A curvature radius r' in the sub-scanning direction (sagittal line curvature radius) at a distance of Y from the optical axis in the main scanning direction is represented as follows.

$$1/r' = 1/r + D_2 Y^2 + D_4 Y^4 + D_6 Y^6 + D_8 Y^8 + D_{10} Y^{10}$$

where r is a sagittal line curvature radius on the optical axis and $D_2$, $D_4$, $D_6$, $D_8$ and $D_{10}$ are sagittal line change coefficients.

In addition, $M_{j\_k}$ is a coefficient exhibiting an aspherical surface in the sagittal line direction. For example, $M_{j\_1}$ is a first-order term of Z and exhibits a surface tilt in the sub-scanning direction (sagittal line tilt). In the first embodiment, a sagittal line tilt amount is changed in the main scanning direction based on 0-, 2-, 4-, 6-, 8- and 10-order coefficients.

Further, the respective coefficients of Table 1 are provided with indexes of u and l, which mean the upper side and the lower side, respectively. With respect to each lens surface apex of the imaging optical system, a side provided with the light sources 1y, 1m, 1c and 1k is defined as the lower side, and a side opposite to the side provided with the light sources 1y, 1m, 1c and 1k is defined as the upper side. Coefficients not provided with the indexes u and l are coefficients common for the upper side and the lower side.

In the first embodiment, as illustrated in FIG. 2B, the first imaging lens 61$ym$ and the second imaging lens 62$ym$ are shared by the optical paths to the photosensitive drum surfaces 7$y$ and 7$m$. Further, the incident surface and the exit surface of the imaging lens 62$ym$ are formed of a multi-stage toric surface in which two toric surfaces are superimposed in the sub-scanning cross section.

In the same manner, as illustrated in FIG. 2B, the first imaging lens 61$ck$ and the second imaging lens 62$ck$ are shared by the optical paths to the photosensitive drum surfaces 7$c$ and 7$k$. Further the incident surface and the exit surface of the imaging lens 62$ck$ are formed of a multi-stage toric surface in which two toric surfaces are superimposed in the sub-scanning cross section.

Polarization, Reflected Light Quantity and Ratio of Image Plane Illuminances

Figure 9:
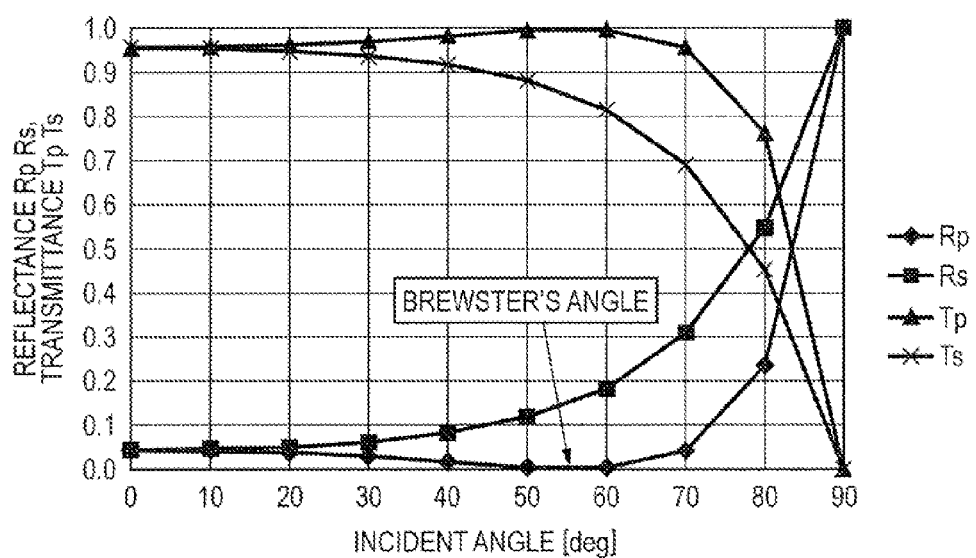
FIG. 9 is an explanatory graph showing a relationship between reflectance and transmittance and an incident angle when a P-polarized beam and an S-polarized beam enter an imaging optical element.

With regard to the effects of the present invention, the polarization, the reflected light quantity and the ratio of image plane illuminances are described. FIG. 9 is a graph showing, for example, an angle dependency of the reflectance and the transmittance when the beams of a P-polarized beam and an S-polarized beam enter an imaging optical element having a refractive index of 1.524. As is clear from FIG. 9, the reflectance of the P-polarized beam on the lens surface of the imaging optical element decreases with an increase of the incident angle, and after the reflectance becomes zero when the incident angle reaches the Brewster's angle, the reflectance increases with the increase of the incident angle. Although the incident angle increases with respect to the lens surface as being distant from the on-axis toward the off-axis in the main scanning direction, the incident angle does not exceed the Brewster's angle in a general optical scanning apparatus. Also in the optical scanning apparatus according to the first embodiment, the incident angle of the beam with respect to the lens surface is equal to or smaller than the Brewster's angle. Therefore, in the case of the P-polarized beam, the reflectance decreases as being distant from the on-axis toward the off-axis on the lens surface of the imaging optical element, and reversely, the transmittance increases. Accordingly, in the case of the P-polarized beam, such a ratio of image plane illuminances is obtained that the transmitted light quantity increases at a scanning area edge portion with respect to a scanning area center portion via the fθ lens and the dustproof glass. On the other hand, in the case of the S-polarized beam, such a ratio of image plane illuminances is obtained that the transmitted light quantity decreases in a reverse manner at a scanning area edge portion with respect to a scanning area center portion.

Figure 8:
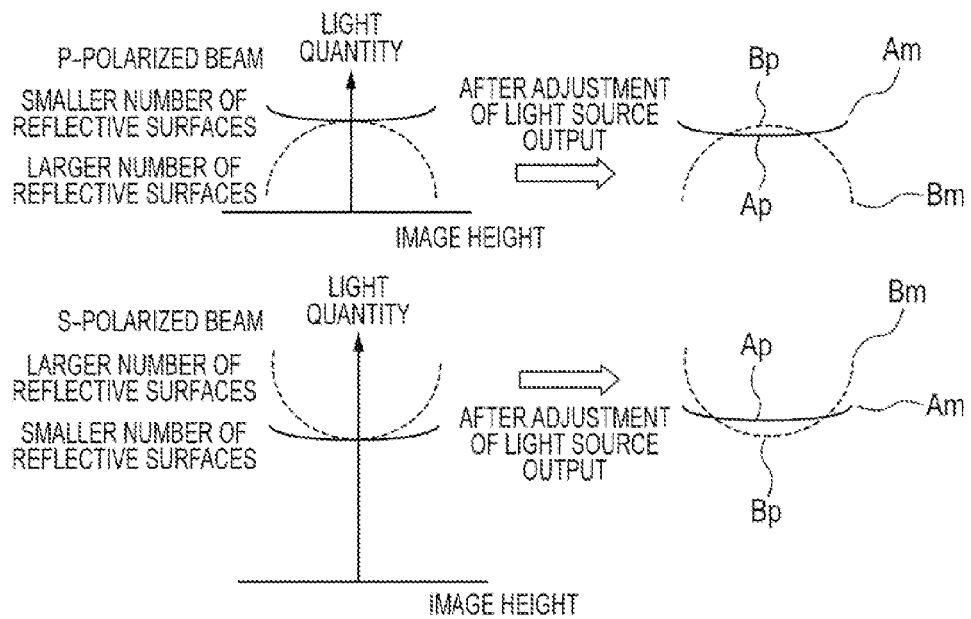
FIG. 8 is a diagram illustrating an operation of the present invention.
Figure 10:
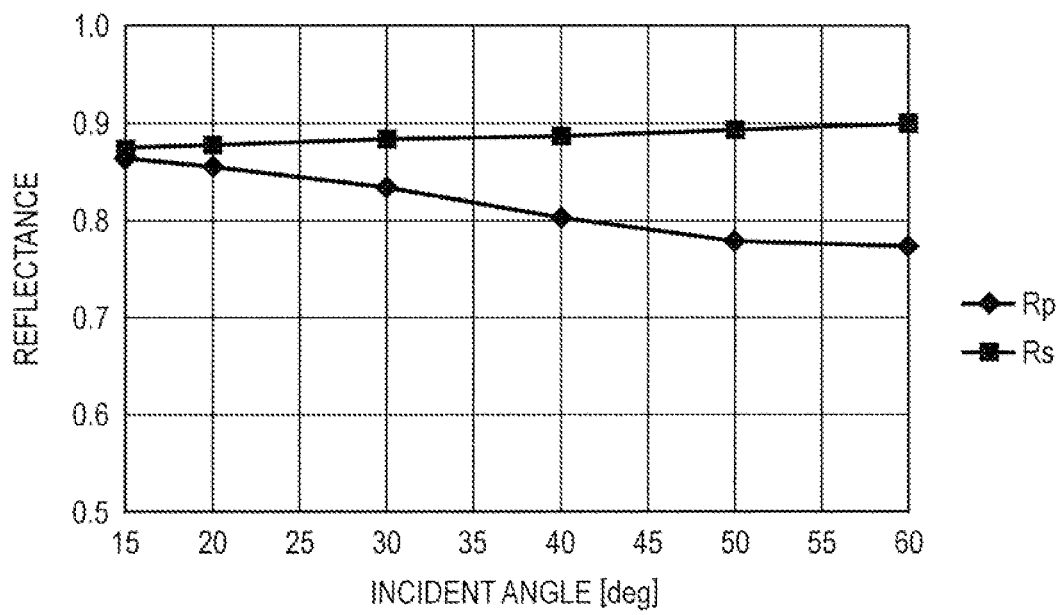
FIG. 10 is a graph showing a reflectance characteristic of a reflection optical element including a reflection surface formed of aluminum (AL), which is used in the embodiments.

The reflectance characteristic of the reflection optical element including a reflection surface formed of Al (aluminum) used in the first embodiment is shown in a graph of FIG. 10. A case where a P-polarized beam enters the deflecting surface of the deflector is considered here. In this case, it is clear that the reflectance decreases and the reflected light quantity decreases with an increase of the incident angle in a range of the incident angle from 15 degrees to 60 degrees with respect to the reflection surface of the reflection optical element. That is, in the optical scanning apparatus, the incident angle increases as being distant from the scanning area center portion toward the scanning area edge portion, and therefore, the reflected light quantity decreases as being closer to the scanning area edge portion with respect to the scanning area center portion. When the number of reflection surfaces increases, as illustrated in FIG. 8, the reflected light quantity at the scanning area edge portion decreases further.

On the other hand, when an S-polarized beam enters the deflecting surface of the deflector, the reflectance increases and the reflected light quantity increases when the incident angle is in the range of the incident angle from 15 degrees to 60 degrees with respect to the reflection surface of the reflection optical element. That is, in the optical scanning apparatus, the incident angle increases as being closer to the scanning area edge portion, and therefore, the reflected light quantity increases as being closer to the scanning area edge portion with respect to the scanning area center portion. When the number of reflection surfaces increases, as illustrated in FIG. 8, the reflected light quantity at the scanning area edge portion increases further. In the present invention, as described in detail below, the difference in the ratio of image plane illuminances between the optical paths is suppressed by adjusting the output of the light source (FIG. 8).

The P-polarized beam means that a composition ratio of the P-polarized beam is equal to or larger than 90%. Similarly, the S-polarized beam means that a composition ratio of the S-polarized beam is equal to or larger than 90%.

Suppression of Difference in Ratio of Image Plane Illuminances Between Optical Paths In the first embodiment, a case in considered, in which the beam entering the deflecting surface of the deflector is set to the P-polarized beam, and adjustment of the light quantity is made of, among the plurality of optical paths from the deflecting surfaces of the deflector to the plurality of surfaces to be scanned, two optical paths on which different numbers of reflection optical elements are disposed. An effective scanning range in the main scanning direction with respect to the center image height of each optical path is represented by ±W, and an image height allowing the same light quantity of a beam for scanning a surface to be scanned on one optical path and a beam for scanning a surface to be scanned on the other optical path is represented by L. Further, a light quantity at the center image height on the surface to be scanned corresponding to the first optical path having the smaller number of reflection optical elements is represented by Ap, and a light quantity on a higher side among the most off-axial image heights is represented by Am. Moreover, a light quantity at the center image height on the surface to be scanned corresponding to the second optical path having the larger number of reflection optical elements is represented by Bp, and a light quantity on a lower side among the most off-axial image heights is represented by Bm.

Figure 1A:
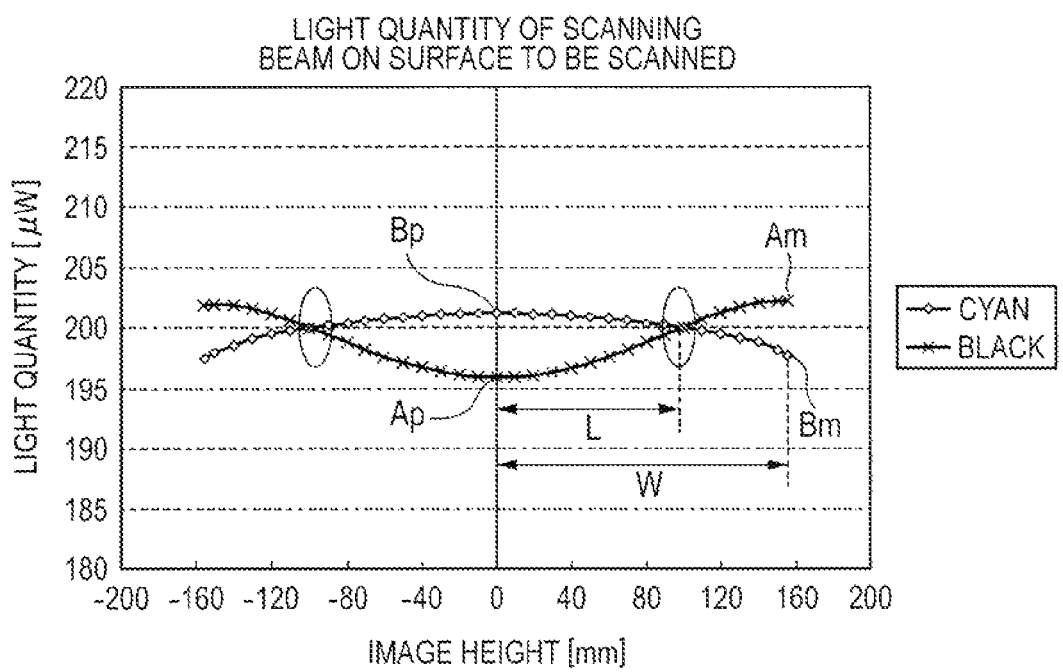
FIG. 1A is a graph showing a ratio of image plane illuminances for each optical path in an optical scanning apparatus according to a first embodiment of the present invention.
Figure 1B:
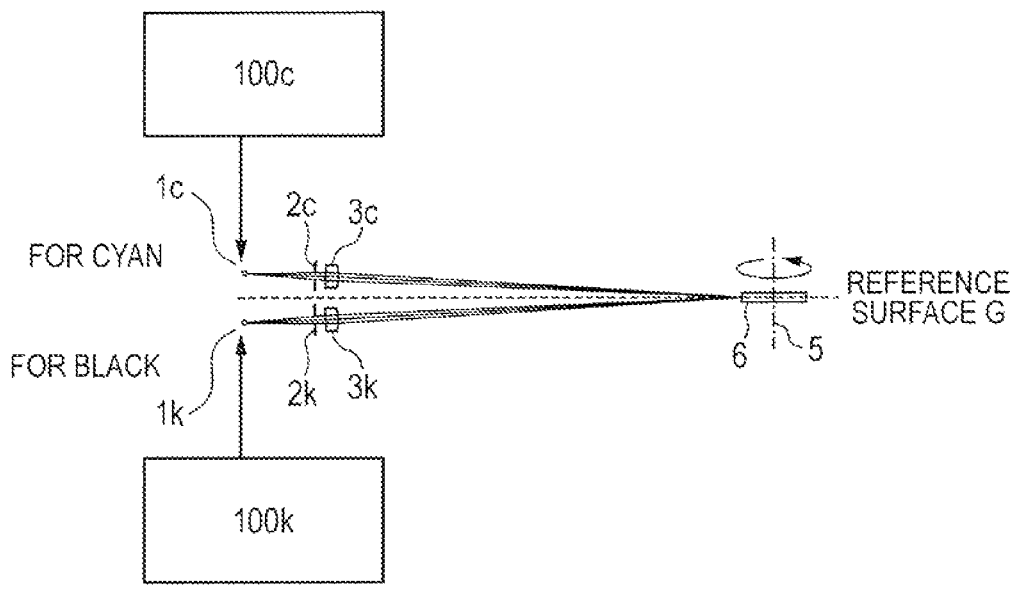
FIG. 1B is a diagram illustrating an adjustor that adjusts an output of a light source in the optical scanning apparatus according to the first embodiment.

In this case, the output of the light source corresponding to at least one of the first optical path and the second optical path is adjusted by an adjustor (adjustors 100$c$ and 100$k$ are illustrated in FIG. 1B) so that the following three conditional expressions are satisfied.

$$Ap < Bp \quad (1)$$

$$Am > Bm \quad (2)$$

$$0.4W < L < 0.8W \quad (3)$$

If the conditional expressions (1), (2) and (3) are not satisfied, it is not preferred because the visibility of the color nonuniformity after superimposing a plurality of colors is increased, which is problematic.

The ratio of image plane illuminances of cyan and black according to the first embodiment is shown in a graph of FIG. 1A. In the graph of FIG. 1A, the settings are as follows in the first embodiment.

W=156 (mm), L=100 (mm), L/W=0.64, Ap=196 (μW), Bp=201 (μW), Am=202 (μW), Bm=197 (μW)

It is more preferred to substitute the above-mentioned conditional expression (3) with the following conditional expression (3a).

$$0.5W < L < 0.7W \quad (3a)$$

From FIG. 1A, even between the optical paths having different numbers of reflection optical elements from each other, it is realized that the difference in the ratio of image plane illuminances between both surfaces to be scanned is suppressed by setting the parameters in an appropriate manner to satisfy the conditional expressions (1), (2) and (3). In the first embodiment, the image height L allowing the same light quantity of the beam for scanning the surface to be scanned on the outer side optical path and the beam for scanning the surface to be scanned on the inner side optical path is set to 100 mm to satisfy the conditional expressions (1), (2) and (3). Therefore, the light quantity is measured at the image height of ±100 mm as indicated by the points surrounded by the ellipses in the graph of FIG. 1A, and the output of the light source is adjusted to achieve the same light quantity on each optical path at this image height.

The adjustment of the output of the light source may be performed by adjusting an output of at least one of the light source $1c$ and the light source $1k$ by using at least one of the adjustors $100c$ and $100k$. By performing the above-mentioned adjustment also on the light source $1y$ and the light source $1m$, the difference in the ratio of image plane illuminances of the respective colors can be suppressed. Although the output of at least one of the light source $1c$ and the light source $1k$ is adjusted to suppress the difference in the ratio of image plane illuminances of cyan and black in the first embodiment, for example, the output of each light source may be adjusted to suppress the difference in the ratio of image plane illuminances of cyan and yellow or black and magenta.

Further, in the first embodiment, the light quantity of the optical scanning apparatus is set to satisfy the following conditional expressions.

$$0.9Bm \le Ap \le 1.1Bm \quad (4)$$

$$0.9Am \le Bp \le 1.1Am \quad (5)$$

If the conditional expressions (4) and (5) are not satisfied, it is not preferred because the visibility of the color nonuniformity after superimposing a plurality of colors depending on the image height between the optical paths is increased. In the first embodiment, specific numerical values are set as follows to satisfy the conditional expressions (4) and (5).

$$Ap/Bm = 0.971$$

$$Bp/Am = 1.019$$

It is more preferred to set the values as follows.

$$0.95Bm \le Ap \le 1.05Bm \quad (4a)$$

$$0.95Am \le Bp \le 1.05Am \quad (5a)$$

With these settings, even between the optical paths having different numbers of reflection optical elements from each other, it is realized that the difference in the ratio of image plane illuminances between both surfaces to be scanned is suppressed by setting the parameters in an appropriate manner to satisfy the conditional expressions (4) and (5).

Second Embodiment

Hereinafter, a second embodiment of the present invention is described. The second embodiment differs from the first embodiment in that the image height for measuring the light quantity of the beam for scanning the surface to be scanned is changed, and a light quantity to which a light quantity offset value calculated from a ratio of image plane illuminances estimated in advance at a design stage is added is set as a light quantity adjustment value. The other configurations and optical operations are the same as those of the first embodiment, thereby obtaining the same effect.

A ratio of image plane illuminances of a cyan optical path and a black optical path according to the second embodiment is shown in a graph of FIG. 4. The configuration of the optical scanning apparatus is the same as that of the first embodiment, and therefore, an illuminance distribution of each optical path is the same as that of the first embodiment. In the first embodiment, the light quantity of the beam for scanning the surface to be scanned is measured at the image height of ±100 mm, and the output of the light source is adjusted so that the light quantities of the optical paths at this image height become the same desired value. In this manner, the color nonuniformity of the center image height and the most off-axial image height after superimposing a plurality of colors is reduced. However, in the measurement of the light quantity, a light quantity measuring unit may not be provided because a measuring unit for measuring other optical performances such as a scanning line curvature is disposed at the desired image height.

Therefore, in the second embodiment, the light quantity of the beam for scanning the surface to be scanned is measured near the center image height (an elliptical frame in the graph of FIG. 4), and is adjusted to the light quantity to which the light quantity offset value calculated from the ratio of image plane illuminances estimated in advance at the design stage is added. If the desired light quantity on the surface to be scanned on each optical path is 200 µW and the ratio of image plane illuminances pp of the black optical path is 3% (design value), adjustment is performed in which a value of 197 µW obtained by subtracting 3%/2=1.5% from 200 µW is set as the adjustment value of the light quantity at the center image height.

On the other hand, when the ratio of image plane illuminances pp of the cyan optical path is −2% (design value), because the ratio of image plane illuminances in the cyan optical path is opposite to that of the black optical path, adjustment is performed in which a value of 202 µW obtained by adding the ratio of image plane illuminances of 2%/2=1% to 200 µW is set as the adjustment value of the light quantity at the center image height. The method of calculating the offset value of the light quantity is not limited thereto, and needs to be considered depending on a profile of the design value of the ratio of image plane illuminances.

In the second embodiment, the measurement of the light quantity of the beam for scanning the surface to be scanned and the adjustment image height are only changed from those of the first embodiment. Therefore, the values of the parameters used in the above-mentioned conditional expressions (1) to (5) are the same, and in the same manner as the first embodiment, satisfy the conditional expressions (1) to (5).

Third Embodiment

A third embodiment of the present invention differs from the first embodiment in that the ratio of image plane illuminances has an inclination. The other configurations and optical operations are the same as those of the first embodiment, thereby obtaining the same effect. The ratios of image plane illuminances of the cyan optical path and the black optical path of the optical scanning apparatus according to the third embodiment are shown in a graph of FIG. 5. In the graph of FIG. 5, it can be understood that the curve representing the ratio of image plane illuminances of the black optical path has an inclination. It can be considered that the cause of the inclination of the curve representing the ratio of image plane illuminances includes a reflectance nonuniformity in the main scanning direction of the deflecting surface of the deflector, a birefringence distribution of the plastic imaging optical element, or an inclination of a polarization direction of the light source.

However, even when an inclination of the curve representing the ratio of image plane illuminances occurs due to the above-mentioned cause, according to the third embodiment, the color nonuniformity after superimposing a plurality of colors can be reduced. In the third embodiment, the image height L allowing the same light quantity of the beam for scanning the surface to be scanned on the outer side optical path and the beam for scanning the surface to be scanned on the inner side optical path is set to 95 mm to satisfy the conditional expression (3). Therefore, the light quantity is measured at the image height of 95 mm, and the output of the light source is adjusted to achieve the same desired light quantity on each optical path at this image height.

As a result, in the third embodiment, the effective scanning range ±W in the main scanning direction with respect to the center image height and the image height L allowing the same light quantity of a beam for scanning a surface to be scanned on one optical path and a beam for scanning a surface to be scanned on the other optical path are set as follows to satisfy the conditional expression (3).

Further, in order to satisfy the conditional expressions (1) and (2), a light quantity at the center image height on the surface to be scanned corresponding to the first optical path having the smallest number of reflection optical elements, which are disposed on the optical path from the deflecting surface of the deflector to the surface to be scanned in the sub-scanning cross section, is represented by Ap, and a light quantity at the most off-axial image heights is represented by Am. Moreover, a light quantity at the center image height on the surface to be scanned corresponding to the second optical path having the largest number of reflection optical elements, which are disposed on the optical path from the deflecting surface of the deflector to the surface to be scanned, is represented by Bp, and a light quantity on a lower light quantity side at the most off-axial image heights is represented by Bm. In this case, the settings are as follows.

W=156 (mm), L=95 (mm), L/W=0.61, Ap=196 (µW), Bp=202 (µW), Am=204 (µW), Bm=198 (µW)

From FIG. 5, even between the optical paths having different numbers of reflection optical elements from each other, it is realized that the difference in the ratio of image plane illuminances between both surfaces to be scanned is suppressed by setting the parameters in an appropriate manner to satisfy the conditional expressions (1), (2) and (3). In the third embodiment, the image height L allowing the same light quantity of the beam for scanning the surface to be scanned on the outer side optical path and the beam for scanning the surface to be scanned on the inner side optical path is set to 95 mm to satisfy the conditional expressions (1), (2) and (3). Therefore, the light quantity is measured at the image height of ±95 mm, and the output of the light source is adjusted to achieve the same desired light quantity on each optical path at this image height.

Further, in the third embodiment, the light quantity of the optical scanning apparatus is set so that the following conditional expressions are satisfied.

$$0.9Bm \leq Ap \leq 1.1Bm \quad (4)$$

$$0.9Am \leq Bp \leq 1.1Am \quad (5)$$

In the third embodiment, specific numerical values are set as follows.

$$Ap/Bm=0.962$$

$$Bp/Am=1.019$$

Therefore, between the optical paths having different numbers of reflection optical elements from each other, even when the curve representing the ratio of image plane illuminances has an inclination, it is realized that the difference in the ratio of image plane illuminances between both surfaces to be scanned is suppressed.

Fourth Embodiment

A fourth embodiment of the present invention differs from the first embodiment in that the number of reflection optical elements disposed on the inner side optical path is two. The other configurations and optical operations are the same as those of the first embodiment, thereby obtaining the same effect.

Figure 6:
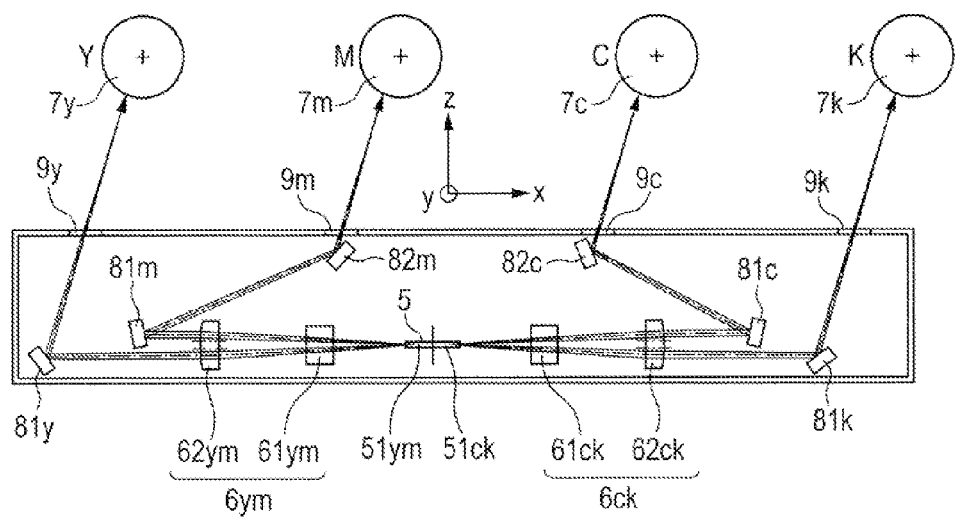
FIG. 6 is a sub-scanning cross-sectional view of a tandem-type optical scanning apparatus according to a fourth embodiment of the present invention.
Figure 7:
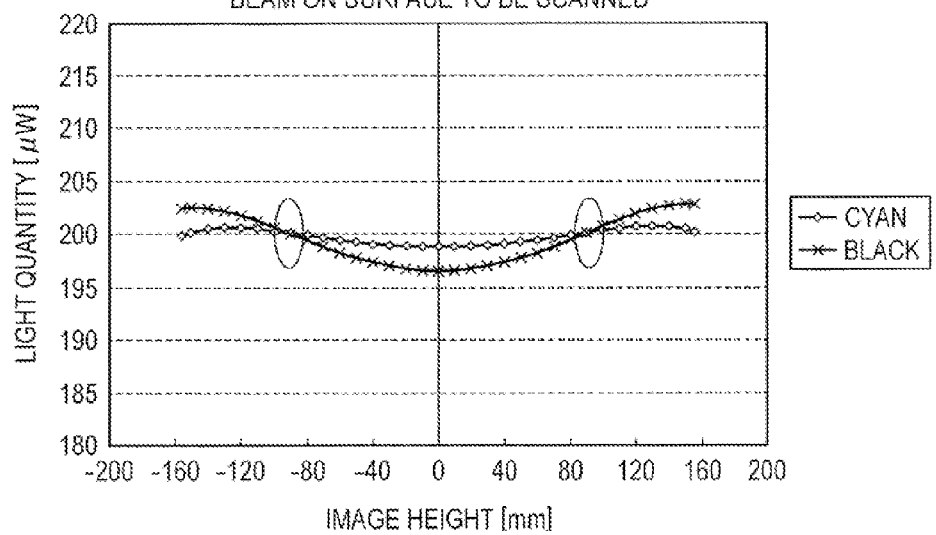
FIG. 7 is a graph showing a ratio of image plane illuminances for each optical path in the optical scanning apparatus according to the fourth embodiment.

FIG. 6 is a sub-scanning cross-sectional view of main parts of a tandem-type optical scanning apparatus according to the fourth embodiment. FIG. 7 is a graph showing ratios of image plane illuminances of a cyan optical path and a black optical path of the optical scanning apparatus according to the fourth embodiment. As illustrated in FIG. 6, the beams from the light sources 1$m$ and 1$c$ traveling toward the surfaces to be scanned 7$m$ and 7$c$ spatially closest to the deflector 5 are deflected and scanned by the deflector 5. After that, the beams from the light sources 1$m$ and 1$c$ are deflected by the two reflection optical elements 81$m$ and 82$m$ and the two reflection optical elements 81$c$ and 82$c$, respectively, thus being guided to surfaces to be scanned 7$m$ and 7$c$, respectively.

The graph of FIG. 7 shows the ratios of image plane illuminances of the black optical path of the outer side optical paths on which one reflection optical element is disposed, through which a beam is guided to the surface to be scanned 7$k$, and a cyan optical path of the inner side optical paths on which two reflection optical elements are disposed, through which a beam is guided to the surface to be scanned 7$c$ as described above. It can be understood that, compared to the first embodiment, the number of the reflection optical elements disposed on the cyan optical path is smaller by one, and hence the ratio of image plane illuminances at the most off-axial image height is not decreased as much as in the first embodiment. Also in such a case, according to the fourth embodiment, the color nonuniformity after superimposing a plurality of colors can be reduced.

In the fourth embodiment, the image height L allowing the same light quantity of the beam for scanning the surface to be scanned on the outer side optical path and the beam for scanning the surface to be scanned on the inner side optical path is set to 90 mm to satisfy the conditional expression (3). Therefore, the light quantity is measured at the image height of 90 mm, and the output of the light source is adjusted to achieve the same desired light quantity on each optical path at this image height.

As a result, in the fourth embodiment, the effective scanning range ±W in the main scanning direction with respect to the center image height and the image height L allowing the same light quantity of a beam for scanning a surface to be scanned on one optical path and a beam for scanning a surface to be scanned on the other optical path are set as follows to satisfy the conditional expression (3).

Further, in order to satisfy the conditional expressions (1) and (2), a light quantity at the center image height on the surface to be scanned corresponding to the first optical path having the smallest number of reflection optical elements, which are disposed on the optical path from the deflecting surface of the deflector to the surface to be scanned in the sub-scanning cross section, is represented by Ap, and a light quantity on a higher light quantity side at the most off-axial image heights is represented by Am. Moreover, a light quantity at the center image height on the surface to be scanned corresponding to the second optical path having the largest number of reflection optical elements, which are disposed on the optical path from the deflecting surface of the deflector to the surface to be scanned, is represented by Bp, and a light quantity at the most off-axial image heights is represented by Bm. In this case, the settings are as follows.

W=156 (mm), L=90 (mm), L/W=0.58, Ap=196 (μW), Bp=199 (μW), Am=203 (μW), Bm=200 (μW)

From FIG. 7, even between the optical paths having different numbers of reflection optical elements from each other, it is realized that the difference in the ratio of image plane illuminances between both surfaces to be scanned is suppressed by setting the parameters in an appropriate manner to satisfy the conditional expressions (1), (2) and (3). In the fourth embodiment, the image height L allowing the same light quantity of the beam for scanning the surface to be scanned on the outer side optical path and the beam for scanning the surface to be scanned on the inner side optical path is set to 90 mm to satisfy the conditional expressions (1), (2) and (3). Therefore, the light quantity is measured at the image height of ±90 mm, and the output of the light source is adjusted to achieve the same desired light quantity on each optical path at this image height.

Further, in the fourth embodiment, the light quantity of the optical scanning apparatus is set so that the following conditional expressions are satisfied.

$$0.9Bm \leq Ap \leq 1.1Bm \quad (4)$$

$$0.9Am \leq Bp \leq 1.1Am \quad (5)$$

In the fourth embodiment, specific numerical values are set as follows.

$$Ap/Bm=0.969$$

$$Bp/Am=0.994$$

Therefore, between the optical paths having different numbers of reflection optical elements from each other, regardless of the number of reflection optical elements, it is realized that the difference in the ratio of image plane illuminances between both surfaces to be scanned is suppressed.

Various embodiments have been described so far. However, a combination of the technical aspects within the scope of the present invention or a modification thereof can be made as appropriate.

First Modification Example

In the above-mentioned embodiments, a case where the beam entering the deflecting surface of the deflector is the P-polarized beam has been described. However, even when the beam entering the deflecting surface of the deflector is the S-polarized beam, the output of the light source can be adjusted as illustrated in FIG. 8. In this case, the light quantity at the center image height on the surface to be scanned on the first optical path having the smaller number of reflection optical elements is represented by Ap, the light quantity on the higher side among the most off-axial image heights is represented by Am, the light quantity at the center image height on the surface to be scanned corresponding to the second optical path having the larger number of reflection optical elements is represented by Bp, and a light quantity on the higher side among the most off-axial image heights is represented by Bm.

Further, an effective scanning range in the main scanning direction with respect to the center image height on the surface to be scanned is represented by ±W, and an image height allowing the same light quantity on the surfaces to be scanned on the first optical path and the second optical path is represented by L. The output of the light source corresponding to at least one of the first optical path and the second optical path is then adjusted by the adjustor so that the following three conditional expressions are satisfied.

$$Ap > Bp$$

$$Am < Bm$$

$$0.4W < L < 0.8W$$

Further, it is preferred to satisfy the following conditional expressions.

$$0.9Bm \leq Ap \leq 1.1Bm$$

$$0.9Am \leq Bp \leq 1.1Am$$

Second Modification Example

Figure 11:
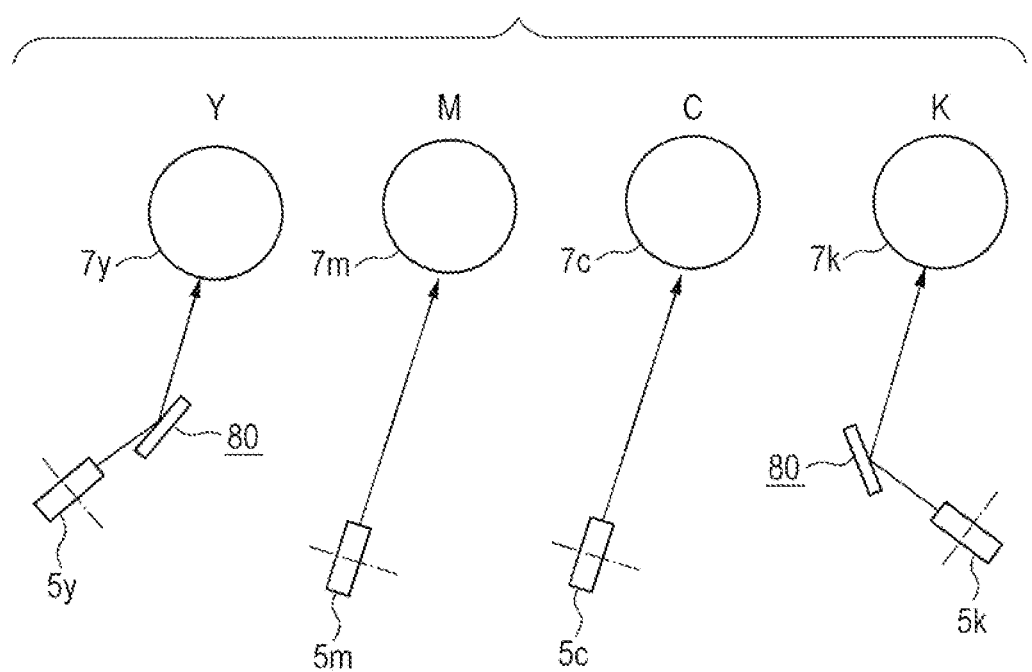
FIG. 11 is a diagram illustrating a modification example in which a deflector is provided for each surface to be scanned.

In the above-mentioned embodiments, the deflector 5 is shared by the optical paths to the photosensitive drum surfaces 7y, 7m, 7c and 7k. However, as illustrated in FIG. 11, a single deflector may be provided for each photosensitive drum surface, without sharing the deflector by all the optical paths. Separate deflectors 5y, 5m, 5c and 5k may be used. In the same manner, separate imaging optical systems may be used without sharing one imaging optical system.

In addition, although it is assumed in the present invention that the number of the reflection optical elements differs between the optical paths, as illustrated in FIG. 11, the present invention may be intended for a configuration including an optical path including no reflection optical element and an optical path including a predetermined number of reflection optical elements 80 (for example, a single reflection optical element 80). In this case as well, the difference in the ratio of image plane illuminances between the optical paths can be suppressed by adjusting the output of the light source in the above-mentioned manner.

Third Modification Example

In the above-mentioned embodiments, there are only two types of the optical paths having the different number of the reflection optical elements. However, the number of the reflection optical elements may differ for all the optical paths, for example. In addition, although the beams from the two light sources are deflected by the single deflecting surface of the deflector, the present invention is not limited to this configuration. For example, the present invention can be applied to a configuration in which the beam from only one light source is deflected by each of plurality of deflecting surfaces and the number of the reflection optical elements differs on each optical path or a case where the beams from three or more light sources are deflected by a single deflecting surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-231338, filed Oct. 21, 2011, and Japanese Patent Application No. 2012-227979, filed Oct. 15, 2012, which are hereby incorporated by reference herein in their entirety.

What is claimed is:

1. An optical scanning apparatus, comprising:
   first and second light sources;
   a deflector configured to deflect beams emitted from the first and second light sources in a main scanning direction;
   first and second imaging optical systems configured to focus the beams deflected by the deflector on first and second surfaces to be scanned, respectively; and
   at least one reflection optical element arranged on each of first and second optical paths from the deflector to the first and second surfaces to be scanned, and reflecting an axial beam in a sub-scanning cross section perpendicular to the main scanning direction, wherein
   the first optical path and the second optical path have different numbers of the reflection optical elements from each other; and
   the optical scanning apparatus further comprises an adjustor configured to adjust at least one of outputs of the first and second light sources so that the following condition is satisfied:

$0.4W < L < 0.8W$, where ±W is an effective scanning range in the main scanning direction with respect to the center image height on the first and second surfaces, and L is an image height allowing the same light quantity on the first and second surfaces to be scanned.

2. An optical scanning apparatus according to claim 1, wherein
   beams entering the deflector are P-polarized beams,
   a larger number of the reflection optical elements are arranged on the second optical path than on the first optical path, and
   the adjuster adjusts the at least one of the outputs of the first and second light source so that the following conditions are satisfied:

$Ap < Bp$; and $Am > Bm$, where Ap and Am are a light quantity at a center image height and a light quantity on a higher side among most off-axial image heights, respectively, on the first surface to be scanned, Bp and Bm are a light quantity at the center image height and a light quantity on a lower side among the most off-axial image heights, respectively, on the second surface to be scanned.

3. An optical scanning apparatus according to claim 2 wherein the adjustor is configured to adjust the at least one of the outputs of the first and second light sources so that the following conditions are further satisfied:

$0.9Bm \leq Ap \leq 1.1Bm$; and $0.9Am \leq Bp \leq 1.1Am$.

4. An optical scanning apparatus according to claim 1, wherein
   beams entering the deflector are S-polarized beams,
   a larger number of the reflection optical elements are arranged on the second optical path than on the first optical path, and
   the adjuster adjusts the at least one of the outputs of the first and second light source so that the following conditions are satisfied:

$Ap > Bp$; and $Am < Bm$, where Ap and Am are a light quantity at a center image height and a light quantity on a higher side among most off-axial image heights, respectively, on the first surface to be scanned, Bp and Bm are a light quantity at the center image height and a light quantity on a lower side among the most off-axial image heights, respectively, on the second surface to be scanned.

5. An optical scanning apparatus according to claim 4 wherein the adjustor is configured to adjust the at least one of the outputs of the first and second light sources so that the following conditions are further satisfied:

$0.9Bm \leq Ap \leq 1.1Bm$; and $0.9Am \leq Bp \leq 1.1Am$.

6. An optical scanning apparatus according to claim 1, wherein the image height L comprises an image height allowing the same light quantity when an offset value calculated from a design value of an image plane illuminance is added to light quantities measured on the first and second surfaces to be scanned.

7. An optical scanning apparatus according to claim 1, wherein the first surface to be scanned is spatially farther from the deflector than the second surface to be scanned.

8. An optical scanning apparatus according to claim 1, wherein each of the reflection optical elements arranged on the first and second optical paths has the same reflectance with respect to beams entering with the same incident angle.

9. An optical scanning apparatus according to claim 1, wherein the reflection optical elements arranged on the first and second optical paths have the same coating structure.

10. An optical scanning apparatus according to claim 1, wherein the first and second imaging optical systems comprise a lens made of a plastic.

11. An image forming apparatus, comprising:
    an optical scanning apparatus comprising:
    first and second light sources;
    a deflector configured to deflect beams emitted from the first and second light sources in a main scanning direction;
    first and second imaging optical systems configured to focus the beams deflected by the deflector on first and second surfaces to be scanned, respectively
    a developing device configured to develop latent images as a toner image, the latent images being formed by the optical scanning apparatus, on first and second photosensitive members arranged in the first and second surfaces to be scanned, respectively; and at least one reflection optical element arranged on each of first and second optical paths from the deflector to the first and second surfaces to be scanned and, reflecting an axial beam in a sub-scanning cross section perpendicular to the main scanning direction, wherein:

the first optical path and the second optical path have different numbers of the reflection optical elements from each other; and the optical scanning apparatus further comprises an adjustor configured to adjust at least one of outputs of the first and second light sources so that the following condition is satisfied:

$$0.4W<L<0.8W,$$

where ±W is an effective scanning range in the main scanning direction with respect to the center image height on the first and second surfaces, and L is an image height allowing the same light quantity on the first and second surfaces to be scanned.

12. An image forming apparatus according to claim 11, further comprising a printer controller configured to:
convert color signals input from an external device into image data; and
input the image data to the optical scanning apparatus.

* * * * *